Dec. 9, 1941.  J. J. BURKE ET AL  2,265,142
WIRE ROPE CENTER TESTING
Filed April 10, 1939   2 Sheets-Sheet 1

Inventors:
JOHN JOSEPH BURKE and
EDWIN ERNEST CASPELL.
by: John E Jackson
their Attorney.

Dec. 9, 1941.    J. J. BURKE ET AL    2,265,142
WIRE ROPE CENTER TESTING
Filed April 10, 1939    2 Sheets-Sheet 2
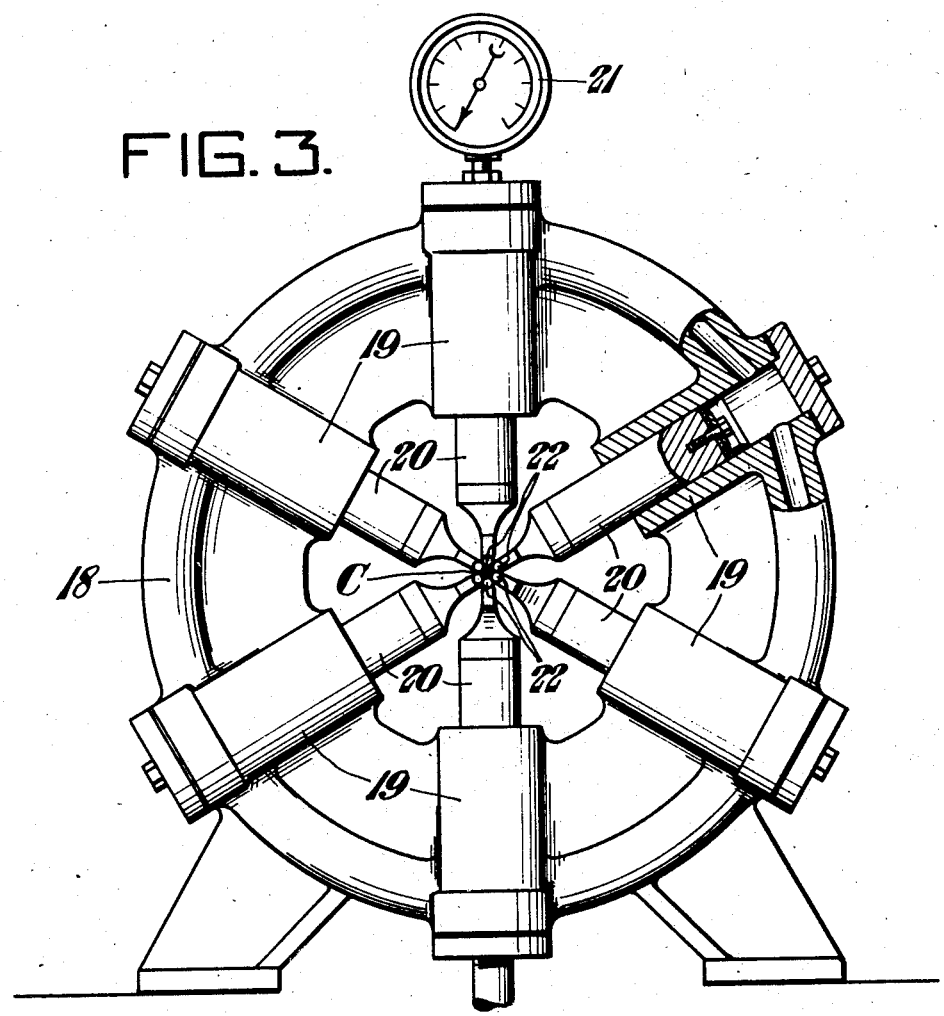
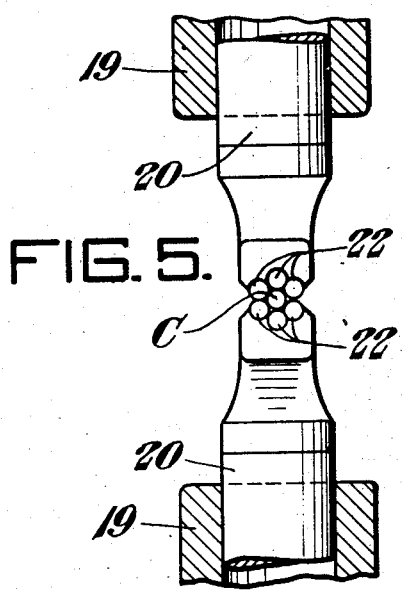
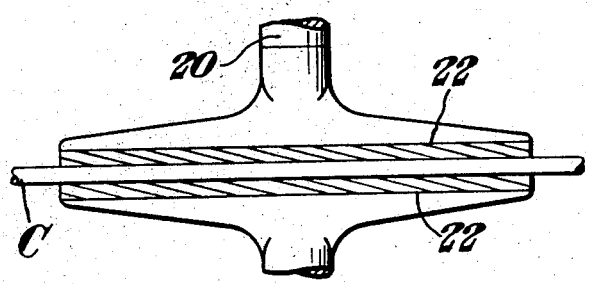
Inventors:
JOHN JOSEPH BURKE and
EDWIN ERNEST CASPELL.
by: John B. Jackson
their Attorney.

Patented Dec. 9, 1941

2,265,142

UNITED STATES PATENT OFFICE 2,265,142

WIRE ROPE CENTER TESTING

John Joseph Burke and Edwin Ernest Caspell, New Haven, Conn., assignors to The American Steel and Wire Company of New Jersey, a corporation of New Jersey Application April 10, 1939, Serial No. 267,106

4 Claims. (Cl. 73—51)

This invention relates to wire rope centers or cores and is particularly concerned with testing these centers or cores to determine how they will act in a rope laying machine and when placed in service as part of a finished rope.

A specific example of the invention is illustrated in the accompanying drawings, in which:

Figures 2 and 3 are enlargements taken from Figure 1;

Figure 4 is a sectional enlargement taken from Figure 3; and,

Figure 5 is a modification.

Figure 1:
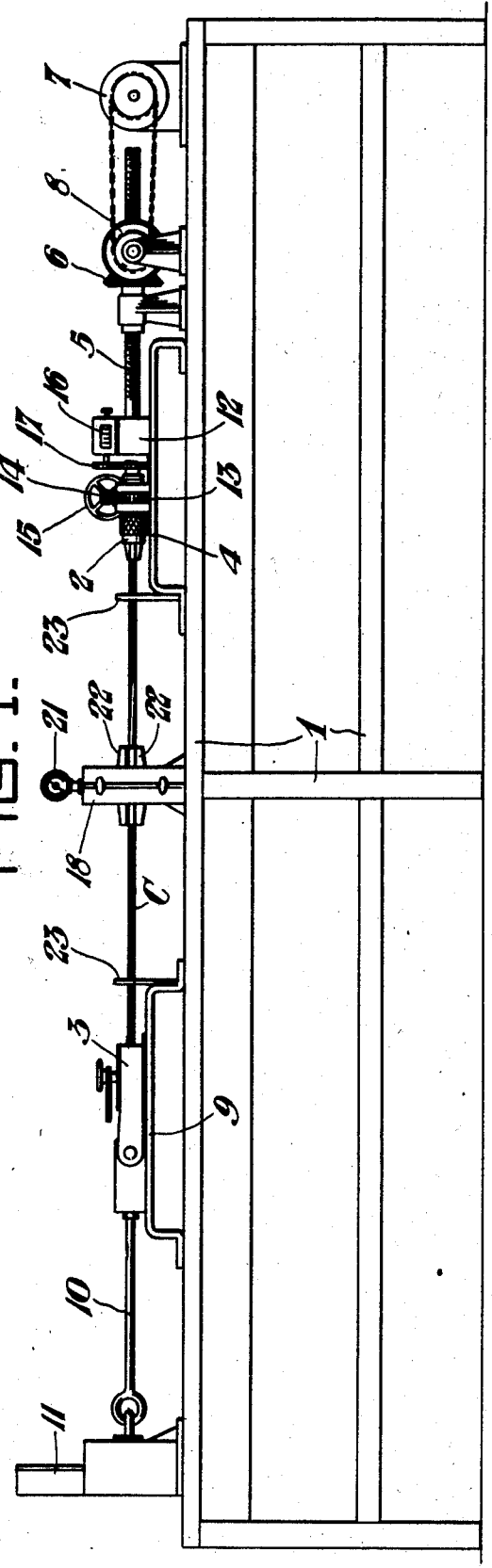
Figure 1 is an elevation.
Figure 2:
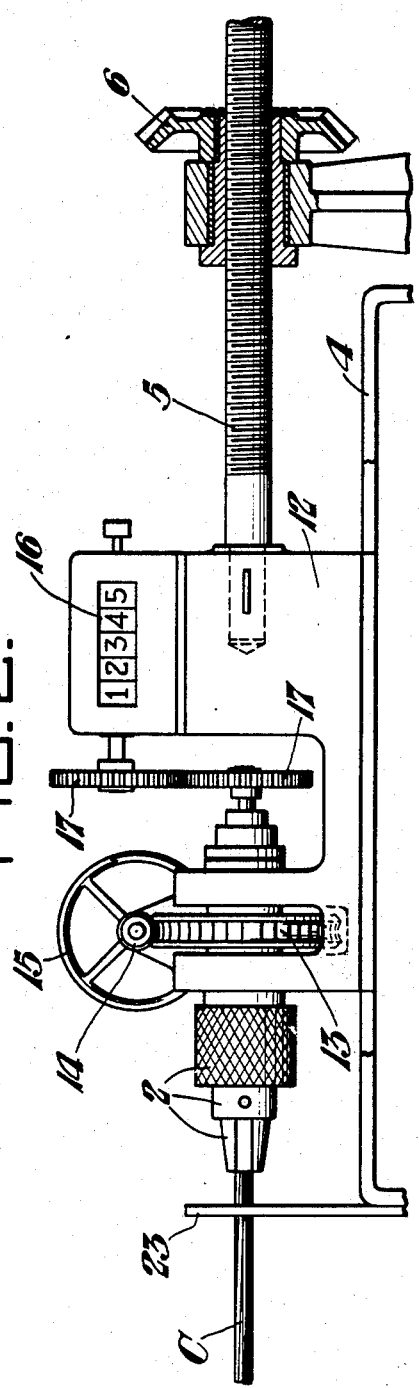

More specifically, these drawings show a bench 1 mounting a chuck 2 and a cam type jaw 3, these two units being adapted to engage the opposite ends of a rope center specimen C whose characteristics are to be determined.

The chuck 2 reciprocatively rides a guide 4 and connects with a screw 5 reciprocated by a nut-gear 6 turned by motor 7 through a gear reduction unit 8. Operation of the motor 7 reciprocates the screw 5 which is fixed against rotation, and so reciprocates chuck 2.

It is possible to tension the center by means of the above arrangement, the jaw 3 reciprocatively riding a guide 9 and connecting through a bar 10 with a tension indicating scale 11, the latter applying the necessary reaction to the jaw 3 by way of the connecting bar 10, so that the center specimen may be tensioned. At the same time, the scale indicates the tension applied the specimen.

Connection of the screw 5 with the chuck 2 is by way of a frame 12, the chuck being rotatively carried by this frame, its rotation being effected by a worm gear 13 fixed to its rotative mounting shaft and operated by a worm 14 powered by a handwheel 15. The number of rotations or turns given the specimen is indicated by a counter 16 connected with the rotative shaft of the chuck by way of gearing 17.

Fibrous rope centers are made under tension by cordage manufacturers with a certain number of crowns per unit of length. When a specimen is cut, the tension on this specimen is released so that its strands untwist, it then no longer being truly representative of the center to be tested. The above described twisting mechanism may be used to retwist the specimen to provide it with the proper number of crowns per unit of length, or it may be used to give the specimen a different twist than was imparted by the cordage manufacturer.

A circular frame 18 is fixed to the top of the bench 1 intermediate the chuck 2 and jaw 3 so that the specimen passes through this frame. A plurality of hydraulic cylinders 19 are positioned by this frame 18 so as to point radially toward the specimen, pistons 20 operating in these cylinders 19 and the latter being interconnected and connected with a suitable source of fluid under pressure, the pressure applied the cylinders being indicated by a pressure gage 21.

Each of the above pistons 20 removably carries an element 22 at its outer end, this element being in the form of a round bar having its outer surface contoured to simulate at least approximately the contour of a rope strand. There should be one of these elements 22 for each of the strands of the rope for which the center, the specimen of which is under test, is to be used, the drawings illustrating six cylinders, pistons and elements because the six-strand rope is a common rope. Also, the diameters of the elements 22 should be the same as these rope strands, and the contours of these elements should, preferably, exactly simulate the contours of these strands. In actual practice very satisfactory results are obtained when the elements 22 are simply smooth, round bars having the same diameters as the rope strands to be laid over the center, the specimen of which is under test. In all cases, the elements 22 should have sufficient lengths to act as do rope strands closing on a center in a rope laying machine.

To use the testing apparatus here described, the specimen is fixed in the chuck 2 and jaw 3, the motor 7 being used to apply tension to the specimen and the handwheel 15 being operated to twist the specimen. The scale 11 provides an indication of the tension applied the specimen while the number of twists it is given are shown by the counter 16.

Fluid is then applied to the various cylinders 19, this forcing the elements 22 radially against the rope to simulate the action of rope strands closing on a center. The pressure required to bring the elements into tangency may be used, for instance, as an indication of what the die pressure must be when actual rope strands are closed on the center in the die of a rope laying machine.

Since the elements 22 are straight, instead of helical, it is necessary to apply a correction factor in calculating the results of the test. This factor is based upon the angle of lay of the actual rope, the secant of the angle of lay of the rope strands about the center of the laying machine being known.

Many rope laying machines use a two-part rope strand closing die, and in such instances the application of equal pressure to all the elements 22 may not provide an accurate indication of what will take place in the machine. The modification, therefore, shows an arrangement using only two of the cylinders 19 and pistons 20, each of the latter mounting an element providing three interconnected round bars, this arrangement simulating the action of a two-part die. In case a four-part die is used by the rope laying machine, there should be four cylinders and pistons, each provided with elements simulating the rope strands handled by the various die parts. That is to say, pressure may be applied the elements in the same manner it is applied in the rope laying machine.

It is to be understood that a wire rope conventionally comprises a plurality of helical strands each made up of a plurality of intertwisted wires, the strands being laid on a center or core which radially supports the strands to hold them in their proper relation when the rope is tensioned. Such a center or core is usually made up of hemp fibers, it having somewhat the appearance of hemp rope but being specially designed to enable it to properly perform its intended function. Sometimes the center or core is made of intertwisted wires, or it may be made of rubber or the like. In all instances the center or core is a very important part of the rope into which it is incorporated, since if it fails to properly support the rope strands the latter lose their relative positions so that tensile stresses do not properly distribute through the strands whereby one or another of the latter receives more than its share of the load, this causing the rope to fracture under a smaller load than that calculated as the ultimate load the rope should carry safely.

At the present time, there is no accurate means for predetermining the action of an untried center except by incorporating it in an experimental rope made in a rope laying machine. To be a truly representative test, this requires the manufacture of a considerable length of rope, this involving an expensive outlay of material and the stoppage of production insofar as is concerned the machine used to make the test length.

The use of the present invention permits an experimental determination of the pressure that must be applied to close the rope strands over a newly designed center. It is possible to vary the speed with which the various elements are powered to radially press them against the specimen, this enabling the test to give at least some indication of what will occur when the rope strands are dynamically pressed against the center of the rope laying machine.

Furthermore, the invention permits a determination of the effects of varying the tension on the center as well as varying its twist. It is to be understood that the length of the specimen should be sufficient to be truly representative of the center and, as previously indicated, that the lengths of the various elements 22 should be sufficient to be truly representative of what occurs when the actual rope strands are laid in place.

As previously mentioned, the elements 22 are removably carried by the pistons 20, and there should be a supply of these elements of varying diameters, numbers and groupings to permit the machine to be used to test centers used in the various types of rope constructions.

It is, of course, possible to modify the details of the machine while still obtaining the various advantages. The specific means by which the elements 22 are removably fixed to the pistons 20 are largely a matter of choice, the only requirement being that they enable the parallel arrangement of the various elements desirable to produce consistent results.

Various additions to what has been disclosed, which might make for more convenient operation. will suggest themselves to the experienced, such as, for instance, the guides 23 which are illustrated by the drawings but not previously described, these guides serving to indicate a given length of the center specimen, this being necessary to determine the number of crowns obtained per unit of length of the specimen by twisting and tensioning the latter, amounts which can be determined by the scale 11 and counter 16. Although the various elements are shown as being pressed against the specimen by hydraulic means. it is possible to use mechanical means provided with suitable pressure indicating instruments.

We claim:

1. A wire rope center testing apparatus including the combination of a plurality of elongated elements, means for positioning said elements in laterally opposed relation so they form a substantially cylindrical group with at least some of said elements movable radially of said group, means for forcing the movable ones of said elements radially inwardly respecting said group and means for indicating the force exerted by the second named means, said combination including means for positioning a sample of the center to be tested longitudinally through the inside of said group of said elements. the last named means being adapted to variably tension said sample, and means for indicating the tension applied said sample by said last named means.

2. A wire rope center testing apparatus including the combination of a plurality of elongated elements, means for positioning said elements in laterally opposed relation so they form a substantially cylindrical group with at least some of said elements movable radially of said group, means for forcing the movable ones of said elements radially inwardly respecting said group and means for indicating the force exerted by the second named means, said combination including means for positioning a sample of the center to be tested longitudinally through the inside of said group of said elements, the last named means being adapted to variably tension said sample, and means for indicating the tension applied said sample by said last named means, the latter also being adapted to variably apply torque to said sample and means being provided for indicating the torque applied by said last named means.

3. Strand testing equipment including the combination of means for longitudinally positioning and tensioning a sample of the strand to be tested, laterally opposed and respective laterally movable elements positioned longitudinally on opposite sides of said sample positioned by said means, means for forcing said elements together to laterally compress said sample therebetween, means for indicating the tension applied said sample by the first named means and means for indicating the lateral compression applied said sample by said elements.

4. Strand testing equipment including the combination of means for longitudinally positioning and tensioning a sample of the strand to be tested, laterally opposed and respective laterally movable elements positioned longitudinally on opposite sides of said sample positioned by said means, means for forcing said elements together to laterally compress said sample therebetween, means for indicating the tension applied said sample by the first named means and means for indicating the lateral compression applied said sample by said elements, said first named means being adapted to apply torque to said sample and said combination including means for indicating the torque applied said sample by said first named means.

JOHN JOSEPH BURKE.
EDWIN ERNEST CASPELL.